United States Patent Office 2,768,088
Patented Oct. 23, 1956

2,768,088

REFRACTORY LININGS FOR FURNACES AND METHOD OF PRODUCING

Robert Doat, Liege, Belgium

No Drawing. Original application May 15, 1952, Serial No. 287,895, now Patent No. 2,669,446, dated February 16, 1954. Divided and this application June 30, 1953, Serial No. 365,284

Claims priority, application Germany May 30, 1951

7 Claims. (Cl. 106—56)

The present invention relates to novel refractory linings for furnaces and methods of producing the same, and more particularly to refractory linings which may be utilized with high temperature cupola furnaces.

The present invention is a divisional application of my copending application Serial No. 287,895 filed May 15, 1952, for "Cupola Furnaces," now U. S. Patent No. 2,669,446, which, in turn, is a continuation-in-part of my U. S. patent application Serial No. 165,420, now abandoned, filed June 1, 1950, and entitled "Process for Melting Metal Ores and Cupola Furnace Therefor."

Although furnaces and particularly cupola furnaces have been provided with various refractory linings it has been found that it would be highly advantageous to utilize a refractory lining capable of being applied in situ or capable of being made into bricks which can then be mounted in the interior of the furnace.

Up to the present day it has been necessary to provide refractory linings having different compositions depending upon the uses for which they were intended. In order to provide a refractory lining which might be suitable for various different uses, several compositions have been proposed, but these compositions either have an extremely low carbon content or no carbon at all.

It is therefore a major object of the present invention to provide a novel refractory lining which is particularly suitable for cupola furnaces.

It is an additional object of the present invention to provide a process for forming such novel refractory lining in a cupola furnace.

With the above objects in view the present invention mainly comprises a refractory lining essentially consisting of finely divided particles of carbon, silica, alumina, ferric oxide, calcium oxide and magnesia.

According to the preferred embodiment, the finely divided particles have a size of less than 5 mm. and are present in the proportion of 1 part carbon to 1.4–1.7 parts silica, 0.07–0.11 part alumina, 0.007–0.023 part ferric oxide, 0.003–0.012 part calcium oxide and 0.0010–0.0035 part magnesia. The terms "part" and "parts" as used in the specification and claims refer to the molecular ratio of the substances to each other. The ratio of each of the substances of the refractory lining to each other is by molecules rather than by weight. Translated into a part by weight relationship, the proportions would be as follows: for each 12 parts by weight of carbon there would be 84–102 parts by weight of silica, 7.14–22.22 parts by weight of alumina, 1.1–3.68 parts by weight of ferric oxides, 0.17–0.67 part by weight of calcium oxide, and 0.04–0.14 part by weight of magnesia.

The process for producing the refractory lining according to the present invention mainly comprises the steps of homogeneously mixing finely divided particles of carbon, silica, alumina, ferric oxide, calcium oxide and magnesia, heating the thus formed homogeneous mixture under pressure so as to form a substantially solid mass of the finely divided particles, thereby obtaining a refractory lining for furnaces.

In the past refractory linings subjected to extreme conditions, as much thermochemical as mechanical, presented the inconvenience of requiring different compositions for different purposes for which the lining was intended; another inconvenience was the frequent necessity of stopping the operation of the furnace in order to repair the lining which was partially destroyed at the high temperatures of operation of the furnace. This was particularly the case with hot blast cupolas.

Various different compositions have been proposed to remedy these inconveniences. These compositions contain either no carbon at all or very little carbon. Occasionally bricks forming these linings were placed on a bed of bricks made of practically pure carbon. The following table indicates the usual composition of refractory linings which do not contain carbon:

| | | | | | |
|---|---|---|---|---|---|
| $SiO_2$ ____percent by weight__ | 51.5 | 55.5 | 58.5 | 81 | 96 |
| $Al_2O_3$ _____do____ | 43 | 37.5 | 34.5 | 16 | 1.55 |
| $Fe_2O_3$ _____do____ | 2.5 | 4.5 | 3 | 1.2 | 0.5 |
| $CaO$ _____do____ | 0.5 | 0.5 | 0.7 | 0.3 | 1.7 |
| $MgO$ _____do____ | 0.6 | 0.5 | 0.5 | 0.5 | 0.05 |
| Misc _____do____ | 2 | 1.5 | 3 | 1 | 0.3 |

One of the characteristics of the present invention is the uniting in the same refractory composition of carbon with the substances listed above.

One can thus prepare a lining capable of resisting extremely high temperatures as well as being capable of resisting acid and basic slags. These linings are particularly suitable for metallurgical cupolas utilizing hot air, the exterior of which furnace is cooled and which cupolas can function also as a gas producer.

The novel lining used in the cupola of the present invention unites with the conventional elements in such refractory linings a predetermined quantity of carbon. The novel lining is produced by combining with carbon, in a predetermined molecular proportion, other elements which are normally used in refractory linings such as $SiO_2$, $Al_2O_3$, $Fe_2O_3$, $CaO$, and $MgO$. All of these elements are ground, milled, pulverized or crushed until their grains have a size of less than about 5 mm. A mixture is then formed from these elements, in such quantities that after drying they will be in the refractory lining in the following molecular proportions:

For 1 mole of C—
  From 1.4 to 1.7 $SiO_2$,
  From 0.07 to 0.11 $Al_2O_3$,
  From 0.007 to 0.025 $Fe_2O_3$,
  From 0.003 to 0.012 $CaO$, and
  From 0.0010 to 0.0035 $MgO$.

A characteristic of this novel lining is that after drying the molecular ratio of $SiO_2$ to $Al_2O_3$ is between 12 and 25. To this mixture thus obtained, only sufficient water is added to form a coherent mass, this quantity of water being in the vicinity of 4–8% by weight of the mixture. With such a lining it is possible for a cupola to operate continuously for long periods of time while maintaining a basic slag.

To the mixture obtained above is added a minimum amount of water which is necessary to form a paste which may be tamped or briquetted under pressure into a coherent mass. This quantity of water is preferably about 4–8% by weight by the total weight of the mixture.

It is thus possible to conveniently line in situ or with the help of bricks of the above indicated composition the crucible of the cupola furnaces. The use of the lining according to the present invention is particularly advantageous in the case of hot blast cupolas where the thickness of the lining is less than 150 mm., the lining being utilized to the exclusion of any other auxiliary lining.

With the use of the refractory lining according to the present invention metallurgical cupolas having a continuous flowing of basic slag can function for very long periods of time without interruption. Of course, the lining may be employed for other fusion apparatus, or for filling pockets in the lining through which the slag flows. It is also possible to obtain, by briquetting under pressure, any desired shape or form of refractory bricks which can be heated by any means to 1300° C. or more.

In all cases, the lining presents the advantage of permitting utilization of apparatus lined therewith for a long period of time without deterioration of the lining and without the necessity of repairing fissures therein. Therefore, such linings are particularly advantageous for cupolas according to the present invention.

The proportions given above for the refractory lining according to the present invention are the preferred proportions and it is possible to deviate considerably from the amounts without greatly diminishing the properties of the refractory lining.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Refractory lining for furnaces, consisting of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia.

2. Refractory lining for furnaces, consisting of a homogeneous mixture of finely divided particles of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia.

3. Refractory lining for furnaces, consisting of a homogeneous mixture of finely divided particles having a diameter of less than 5 mm. of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia.

4. A process of producing refractory lining for furnaces comprising the steps of homogeneously mixing finely divided particles of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia with a minor quantity of water adjusted to form a homogeneous paste thereof; heating the thus formed homogeneous paste under pressure at a temperature sufficiently high to dry said paste and bind together said particles to form a substantially solid mass of said finely divided particles, thereby obtaining a refractory lining for furnaces.

5. A process of producing refractory lining for furnaces comprising the steps of homogeneously mixing finely divided particles of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia with 4–8% of water by weight of the total weight of said mixture so as to form a homogeneous paste thereof; heating the thus formed homogeneous paste under pressure at a temperature sufficiently high to dry said paste and bind together said particles to form a substantially solid mass of said finely divided particles, thereby obtaining a refractory lining for furnaces.

6. A process of producing refractory lining for furnaces comprising the steps of homogeneously mixing finely divided particles having a diameter of less than 5 mm. of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia with 4–8% of water by weight of the total weight of said mixture so as to form a homogeneous paste thereof; heating the thus formed homogeneous paste under pressure at a temperature sufficiently high to dry said paste and bind together said particles to form a substantially solid mass of said finely divided particles, thereby obtaining a refractory lining for furnaces.

7. A process of producing a refractory lining for furnaces in situ comprising the steps of homogeneously mixing finely divided particles having a diameter of less than 5 mm. of carbon, silica, alumina, ferric oxide, calcium oxide and magnesia in the proportions of 1 molecule of carbon to 1.4–1.7 molecules silica, 0.07–0.11 molecule alumina, 0.007–0.025 molecule ferric oxide, 0.003–0.012 molecule calcium oxide and 0.0010–0.0035 molecule magnesia with a quantity of water adjusted to form a homogeneous paste thereof; applying said homogeneous paste to the inner wall of a furnace so as to coat said inner wall of said furnace with said paste; and drying said paste on said inner wall of said furnace so as to form a substantially solid coating thereon, thereby forming a refractory lining on said wall of said furnace.

References Cited in the file of this patent

UNITED STATES PATENTS

| Number | Name | Date |
| --- | --- | --- |
| 138,780 | Atwood | May 13, 1873 |
| 192,398 | Wile | June 26, 1877 |
| 218,334 | Thomas | Aug. 5, 1879 |
| 247,329 | Flannery | Sept. 20, 1881 |
| 735,528 | Kirkpatrick | Aug. 4, 1903 |
| 1,249,960 | Hollingsworth et al. | Dec. 11, 1917 |
| 1,303,993 | Tone | May 20, 1919 |
| 1,761,343 | Holzapfel | June 3, 1930 |
| 2,480,473 | Johnson | Aug. 30, 1949 |
| 2,626,871 | Zinszer | Jan. 27, 1953 |